(12) United States Patent
Nakamoto

(10) Patent No.: US 11,091,284 B2
(45) Date of Patent: Aug. 17, 2021

(54) BAG PROCESSOR

(71) Applicant: TOYO JIDOKI CO., LTD., Tokyo (JP)

(72) Inventor: Kakue Nakamoto, Yamaguchi-ken (JP)

(73) Assignee: TOYO JIDOKI CO., LTD., Tokyo (JP)

( * ) Notice: Subject to any disclaimer, the term of this patent is extended or adjusted under 35 U.S.C. 154(b) by 116 days.

(21) Appl. No.: 16/259,927

(22) Filed: Jan. 28, 2019

(65) Prior Publication Data

US 2019/0233152 A1 Aug. 1, 2019

(30) Foreign Application Priority Data

Jan. 31, 2018 (JP) .............................. JP2018-015890

(51) Int. Cl.
| | |
|---|---|
| *B65B 43/46* | (2006.01) |
| *B65B 51/32* | (2006.01) |
| *B65B 51/14* | (2006.01) |
| *B65B 43/30* | (2006.01) |
| *B65B 43/52* | (2006.01) |

(Continued)

(52) U.S. Cl.
CPC .............. *B65B 43/465* (2013.01); *B65B 3/04* (2013.01); *B65B 43/16* (2013.01); *B65B 43/30* (2013.01); *B65B 43/52* (2013.01); *B65B 51/146* (2013.01); *B65B 51/32* (2013.01); *B65G 54/02* (2013.01)

(58) Field of Classification Search
CPC .. B65B 3/04; B65B 3/045; B65B 3/34; B65B 43/30; B65B 43/32; B65B 43/44; B65B 43/465; B65B 43/54; B65B 51/146; B65B 51/32; B65B 57/06; B65B 57/08; B65B 43/16; B65G 54/02
See application file for complete search history.

(56) References Cited

U.S. PATENT DOCUMENTS

| | | | |
|---|---|---|---|
| 3,982,376 A * | 9/1976 | Ikeda ..................... | B65B 43/30 53/53 |
| 6,692,196 B1 * | 2/2004 | Simm et al. ........... | B65G 54/02 198/465.2 |

(Continued)

FOREIGN PATENT DOCUMENTS

| | | | | |
|---|---|---|---|---|
| DE | 10356073 A1 | 7/2005 | | |
| EP | 2522584 A1 * | 11/2012 | ........... | B65B 43/465 |

(Continued)

OTHER PUBLICATIONS

Information Offer Form of Jul. 17, 2020 issued in Japanese Patent Application No. 2018-15890 with English translation (30 pgs.).

(Continued)

*Primary Examiner* — Stephen F. Gerrity
(74) *Attorney, Agent, or Firm* — Pillsbury Winthrop Shaw Pittman, LLP

(57) ABSTRACT

A transfer device of a bag processor includes a rail member which defines a transfer route and a plurality of movable gripper pairs. At various processing stations on the transfer route, time for executing a particular process may differ. The number of bags processed at each processing station and transfer states of the bags is controlled to ensure that a number of processed bags is equal. Bags on which first process has been executed are stocked on an upstream side of the second processing station.

16 Claims, 4 Drawing Sheets

(51) Int. Cl.
*B65B 43/16* (2006.01)
*B65B 3/04* (2006.01)
*B65G 54/02* (2006.01)

(56) References Cited

U.S. PATENT DOCUMENTS

| | | | |
|---|---|---|---|
| 7,597,187 B2* | 10/2009 | Bausenwein et al. | B65G 54/02 |
| | | | 198/580 |
| 10,501,222 B2* | 12/2019 | Nakamoto | B65B 51/32 |
| 2007/0105698 A1 | 5/2007 | Nagano et al. | |
| 2013/0152516 A1 | 6/2013 | Sammons et al. | |
| 2014/0244028 A1* | 8/2014 | Giloh et al. | B65G 54/02 |
| | | | 700/230 |
| 2015/0048817 A1 | 2/2015 | Prussmeier | |
| 2016/0146891 A1 | 5/2016 | Prussmeier et al. | |
| 2016/0241173 A1 | 8/2016 | Prusseier et al. | |
| 2018/0016045 A1 | 1/2018 | Kakue | |
| 2020/0002040 A1* | 1/2020 | von Birgelen et al. | B65B 3/04 |

FOREIGN PATENT DOCUMENTS

| | | |
|---|---|---|
| EP | 2788260 B1 | 4/2016 |
| JP | 2001072004 A * | 3/2001 |
| JP | 2006-007593 A | 1/2006 |
| JP | 4290290 B2 | 4/2009 |
| JP | 2010-132405 A | 6/2010 |
| JP | 2016-531058 A | 10/2016 |
| JP | 2018-008726 A | 1/2018 |

OTHER PUBLICATIONS

Linear Transport Systems Catalog, "Benefit from intelligent drive technology. XTS. The eXtended Transport System"Beckhoff New Automation Technology, 72 pgs w/English translation.
Information Offer Form dated May 8, 2020 issued in corresponding Japanese Patent Application No. 2018-15890 with English translation.
Office Action dated Jun. 9, 2020 issued in corresponding EP Application No. 19 154 433.7.
Extended European Search Report dated Apr. 5, 2019 issued in corresponding European Patent Application No. 19154433.7.
Notice of Reason for Rejection dated Jun. 29, 2021, issued in corresponding Japanese Patent Application No. 2018-015890 with English translation (10 pgs.).

* cited by examiner

BAG PROCESSOR

CROSS-REFERENCE TO RELATED APPLICATIONS

The present application is based on the advantage of the priority of Japanese Patent Application No. 2018-15890, filed on Jan. 31, 2018 and claims the priority, the contents of the present application are incorporated herein by reference in its entirety.

TECHNICAL FIELD

The present invention relates to, for example, a bag processor which clamps both side ends of a bag by a pair of grippers and executes bag processing (opening, filling, sealing, and the like) at a predetermined position while transferring the bag.

BACKGROUND ART

As a typical example of this kind of bag processor, a bagging and packaging machine is exemplified. In general, the bagging and packaging machine clamps both side ends of the bag by a pair of right and left grippers in a state where a mouth of the bag faces upward and executes various bag processing by a plurality of bag processing devices while transferring the grippers along a transfer route.

The bag processing device described above means, for example, a bag opening device to open the mouth of the bag, a filling device to fill contents into the bag, and a sealing device to seal the mouth of the bag. In a case where the bag processing devices described above are arranged on the transfer route, for example, after the bag opening device opens the mouth of the bag, the filling device fills the contents, and subsequently, the sealing device seals the mouth, so that a bagged product can be produced.

The bagging and packaging machine described above employs a circular or race track shaped transfer route in many cases, and for example, JP 4290290 B and EP 2788260 B1 disclose a bagging and packaging machine including a race track shaped transfer route. Typically, the race track shaped transfer route is a loop-shaped transfer route including a pair of straight lanes facing each other and a pair of semicircular curved lanes for connecting between ends of the pair of straight lanes and the other ends. However, in a broad sense, the race track shaped transfer route means a non-circular and loop-shaped transfer route.

In the bagging and packaging machine in JP 4290290 B, the bag processing device on the transfer route executes the bag processing as following a bag so that the bag processing can be continuously executed without stopping the bag. Therefore, high production capacity can be secured. Furthermore, for example, the bag opening device can open the plurality of bags at the same time, and the sealing device can seal the plurality of bags at the same time. The production capacity is further enhanced.

On the other hand, in the bagging and packaging machine in EP 2788260 B1, electromagnets are arranged on a rail member forming the transfer route, a permanent magnet is provided in a gripper, and the gripper is transferred by linear motor drive. With this structure, by adjusting excitation of the electromagnet, a transfer speed of the gripper and a distance between the grippers next to each other can be adjusted.

In general, a pair of grippers is used as a single unit, and a driving mechanism for extending or shortening a distance between the pair of grippers is provided for each unit. The driving mechanism is provided to bring the grippers closer to each other at the same time as the bag opening device executes opening processing and separate the grippers from each other before sealing processing is executed by the sealing device. On the other hand, in the device disclosed in EP 2788260 B1, since the pair of grippers next to each other can be separated from or closed to each other by a linear motor for transfer, the device is useful in that it is not necessary to provide the driving mechanism described above.

Furthermore, in the transfer route of the bagging and packaging machine in EP 2788260 B1, the plurality of bag processing devices is arranged on one of the pair of straight lanes, and the bag processing device is not arranged on the other lane. Then, the grippers are transferred so that a transfer speed of the gripper on the other lane is faster than a transfer speed of the gripper on one lane, and the gripper is returned from the other lane to the one lane. Accordingly, while the number of grippers is reduced in comparison with the bagging and packaging machine for circulating the grippers at a constant transfer speed, it is possible to secure high production capacity.

CITATION LIST

Patent Literature

Patent Literature 1: JP 4290290 B
Patent Literature 2: EP 2788260 B1

SUMMARY OF INVENTION

Technical Problem

In the bagging and packaging machine in JP 4290290 B, since the grippers are continuously transferred at a constant transfer speed, for example, by setting a following distance in which the filling device which takes time to execute bag processing follows the bag to be longer than a following distance in which a bag opening device which does not take long time to execute the bag processing follows the bag, the bag processing can be continuously executed. On the other hand, it is possible to execute the filling processing on the same bag in a stepwise manner by making the following distance of the filling device be equal to the following distance of the bag opening device and providing the plurality of filling devices on a transfer route.

However, in a case where the following distance of the filling device is set to be long as in the former case, a following mechanism of the filling device becomes complicated or larger, and even in a case of the latter case, the number of filling devices increases. In both cases, cost is increased.

On the other hand, the inventor of the present invention has found that the problem can be solved which occurs in a continuous transfer type packaging machine as described above if a linear motor drive transfer method as in EP 2788260 B1 is employed and a transfer state of the grippers is devised. However, although the bagging and packaging machine in EP 2788260 B1 executes the bag processing such as opening, filling, and sealing, details of the transfer state of the bag in each bag processing are not disclosed. Therefore, the knowledge found by the inventor of the present invention is not included, and it is difficult to say that the device has been sufficiently devised in order to simplify and miniaturize the entire device and suppress the number of bag processing devices.

The present invention has been made in view of the above circumstances, and an object of the present invention is to provide a bag processor which transfers a holding member of a bag such as a gripper by linear motor drive and which can efficiently produce a bagged product while simplifying and miniaturizing the entire device or suppressing the number of bag processing devices.

Solution to Problem

A bag processor includes a transfer device which includes a rail member which defines an endless transfer route on a horizontal surface and a plurality of holding members which is held by the rail member and is capable of moving along the transfer route and is transferred along the transfer route as the holding member holds a bag or a spout, a supply device which delivers the bag or the spout to the holding member, and at least two bag processing devices which are arranged on the transfer route, positioned on a downstream side of the supply device in a transfer direction of the bag or the spout, and repeatedly execute bag processing on the bag, the spout, or the bag with the spout sequentially transferred, in which a plurality of electromagnets aligned along the transfer route is provided on the rail member, a permanent magnet is provided on the holding member, each holding member is transferred by linear motor drive, and a transfer speed is adjusted according to a current supplied to the electromagnet, the bag processing devices include a first bag processing device and a second bag processing device arranged on the downstream side of the first bag processing device in the transfer direction, a unit processing time per bag processing of the first bag processing device is different from a unit processing time per bag processing of the second bag processing device, and the number of processed bags, spouts, or bags with spouts per bag processing of the first bag processing device is different from the number of processed bags, spouts, bags with spouts per bag processing of the second bag processing device, and the first bag processing device and the second bag processing device are controlled and a transfer state of the holding member is controlled by the transfer device so that the number of bags, spouts, or bags with spouts on which the bag processing is executed by the first bag processing device or the second bag processing device of which the unit processing time is shorter during a unit processing time of the first bag processing device or the second bag processing device of which the unit processing time is longer becomes the same as the number of processed bags, spouts, or bags with spouts per bag processing of the device of which the unit processing time is longer, and the bags, spouts, or bags with spouts on which the bag processing has been executed by the first bag processing device equal to or more than the number of processed bags, spouts, bags with spouts per bag processing of the second bag processing device are stocked on the upstream side of the second bag processing device while the second bag processing device executes bag processing.

The bag processor according to the present invention in which the first bag processing device and the second bag processing device may execute bag processing in bag processing regions which are determined in correspondence with the respective devices, the first bag processing device or the second bag processing device of which a unit processing time is shorter may execute bag processing as following the bag, the spout, or the bag with the spout at a following speed synchronized with a transfer speed of the bag, the spout, and the bag with the spout which is transferred by the holding member in the bag processing region set for the device in a unit processing time of the device, and the first bag processing device or the second bag processing device of which the unit processing time is longer may execute the bag processing as following the bag, the spout, or the bag with the spout or executes the bag processing on the bag, the spout, or the bag with the spout which is stopped in the bag processing region set to be smaller than a distance determined by multiplying a transfer speed at the time when the bag, the spout, or the bag with the spout passes through the device of which the unit processing time is shorter by the unit processing time of the device.

In the bag processor according to the present invention, both the first bag processing device and the second bag processing device may execute bag processing on the bag, spout, or bag with spout which is stopped.

In the bag processor according to the present invention, the holding member may be a gripper pair including a pair of grippers next to each other which is separately held by the rail member and is separately movable along the transfer route, and the pair of grippers holds the bag.

In the bag processor according to the present invention, the bag may be a type of bag which seals contents by sealing a mouth of the bag, the first bag processing device is a filling device which fills the contents into the bag, and the second bag processing device is a first bag mouth sealing device which seals the mouth of the bag.

In the bag processor according to the present invention, the transfer route may have a racetrack shape and in which a pair of straight lanes and a pair of semicircular curved lanes for connecting between one ends of the pair of straight lanes and between another ends form a loop shape, and the supply device is arranged on one of the pair of straight lanes, and the first bag mouth sealing device is arranged on the another one of the pair of straight lanes.

Furthermore, in the bag processor according to the present invention, the filling device may be a liquid filling device and is arranged on the one of the pair of straight lanes.

Furthermore, in the bag processor according to the present invention, the filling device may be arranged on the another one of the pair of straight lanes.

In the bag processor according to the present invention, the bag processing device may further include a bag mouth cooling device which is arranged on a downstream side of the first bag mouth sealing device as the second bag processing device, and the bag mouth cooling device is arranged on the one of the pair of straight lanes.

In the bag processor according to the present invention, it is possible that the bag processing device may further include a second bag mouth sealing device which is arranged on the downstream side of the first bag mouth sealing device as the second bag processing device and seals the mouth of the bag, and the second bag mouth sealing device is arranged on the one of the pair of straight lanes.

Furthermore, in the bag processor according to the present invention, the holding member may be a spout holding claw for holding the spout.

According to the present invention, the bagged products can be efficiently produced while the entire size of processor is simplified or miniaturized or the number of bag processing devices are reduced.

DESCRIPTION OF EMBODIMENTS

Hereinafter, an embodiment of the present invention will be described with reference to the drawings.

(Bag Processor)

Figure 1:
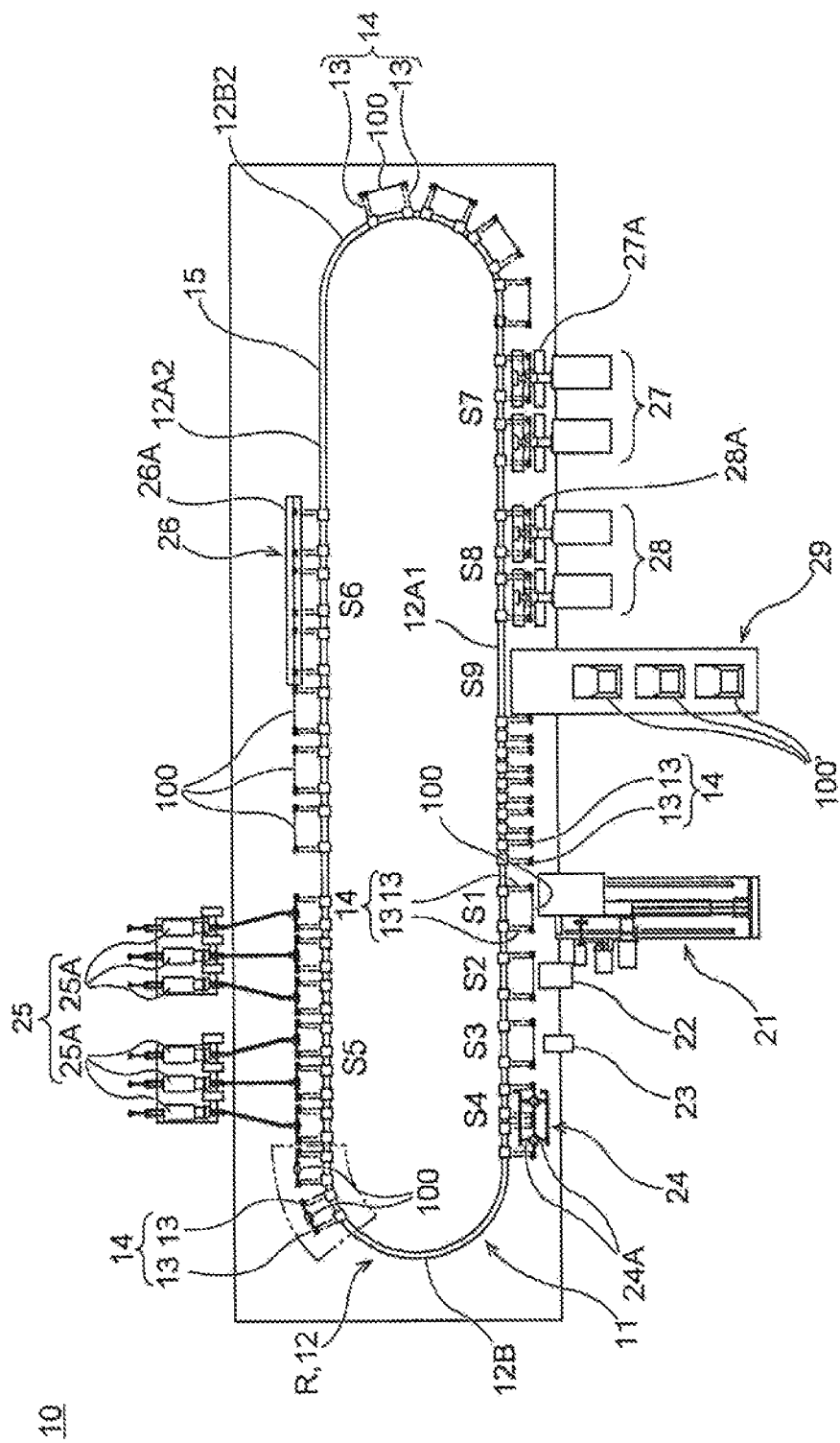
FIG. 1 is a plan view of a bagging and packaging machine as a bag processor according to one embodiment of the present invention.

FIG. 1 is a plan view of a bagging and packaging machine 10 as a bag processor according to one embodiment of the present invention. The bagging and packaging machine 10 illustrated in FIG. 1 includes a transfer device 11, a bag supply device 21 as a supply device, a plurality of bag processing devices 22 to 28, and a discharge conveyor device 29. The transfer device 11 includes a rail member 12 which determines an endless transfer route R on a horizontal surface and a plurality of gripper pairs 14 as holding members. Each of gripper pair 14 includes a pair of grippers 13 and 13 next to each other which is separately held by the rail member 12 and can separately move along the transfer route R. Each gripper pair 14 is transferred along the transfer route R while holding (specifically, clamping) both side ends of a bag 100 by the pair of grippers 13 and 13.

The transfer route R has a race track shape forming a loop-like shape by using a pair of straight lanes and a pair of semicircular curved lanes which connects between one ends of the pair of straight lanes and between the other ends of the pair of straight lanes. To form such a transfer route R, the rail member 12 includes a first straight portion 12A1 which forms one of the pair of straight lanes, a second straight portion 12A2 which forms another one of the pair of straight lanes, a first curved portion 12B1 which forms one of the pair of curved lanes, and a second curved portion 12B2 which forms another one of the pair of curved lanes.

A plurality of electromagnets 15 (refer to FIGS. 4 and 5) aligned along the transfer route R is provided in the rail member 12, and a permanent magnet 16 (refer to FIGS. 4 and 5) is provided in each gripper 13, each gripper 13 is transferred by linear motor drive, and a transfer speed is adjusted according to a current supplied to the electromagnets 15. That is, the gripper 13 receives a magnet force from the electromagnet 15 by the permanent magnet 16 to generate a driving force toward a transfer direction, and the transfer speed is adjusted by the strength of the magnet force.

Figure 4:
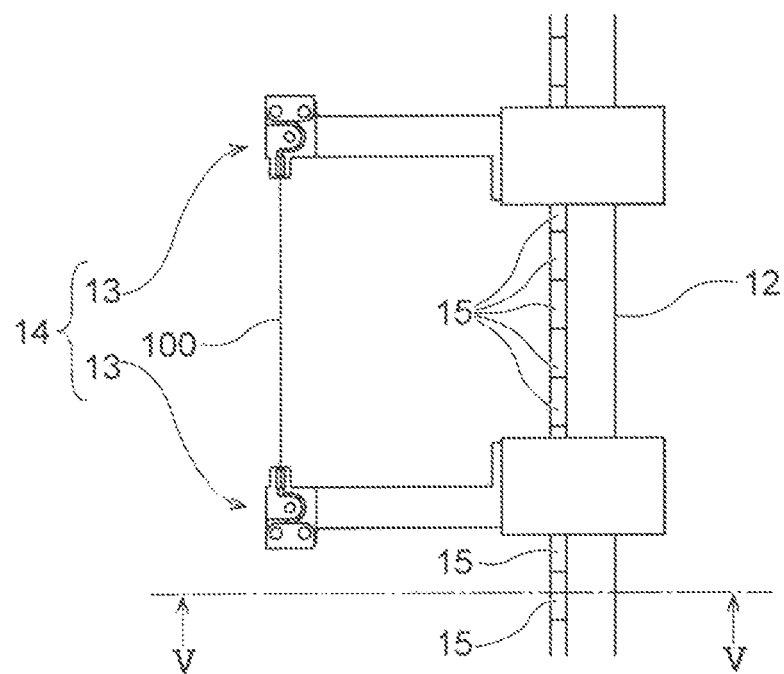
FIG. 4 is a plan view of a gripper pair including a pair of grippers to be transferred by the bagging and packaging machine illustrated in FIG. 1.
Figure 5:
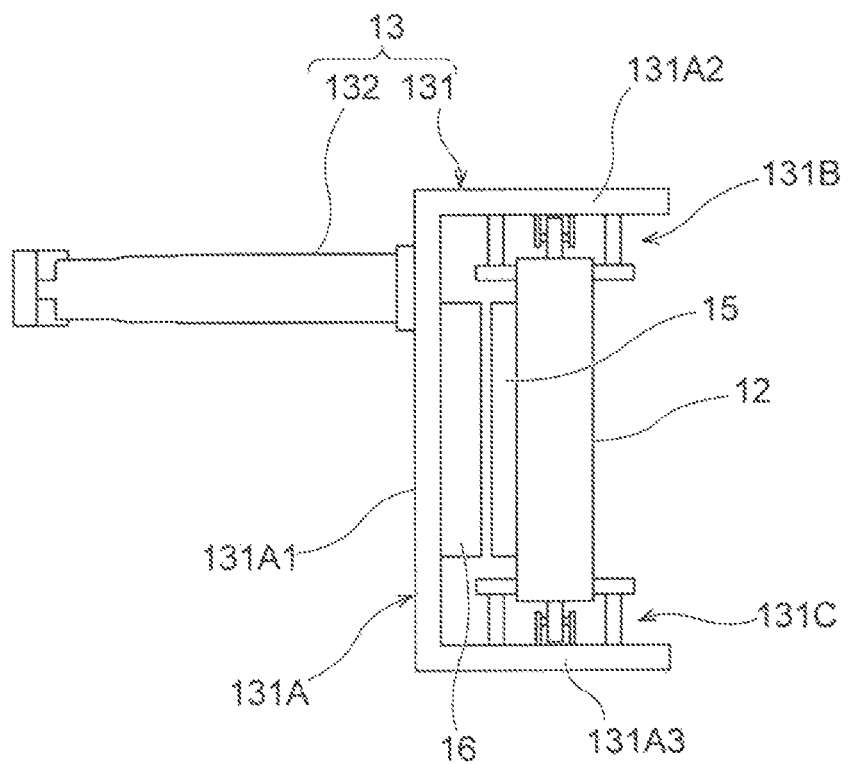
FIG. 5 is a view of the grippers viewed in a direction of arrows V in FIG. 4.

FIG. 4 is a plan view of the gripper pair 14, and FIG. 5 is a view of the gripper 13 viewed from arrows V in FIG. 4. As illustrated in FIGS. 4 and 5, the electromagnets 15 are provided on an entire outer peripheral surface of the outer peripheral surface and the inner peripheral surface facing in the horizontal direction in the rail member 12. Although not shown, the electromagnet 15 includes an iron core and a coil wound around the iron core, and the electromagnet 15 is formed so that a current is supplied from a drive control device to the coil to generate the magnet force from the iron core.

In the present embodiment, the electromagnets 15 are provided across the entire outer peripheral surface of the rail member 12. However, the arrangement of the electromagnets 15 is not limited to this form. For example, it is possible that the electromagnets 15 are provided on a part of the rail member 12 and are not provided on the other part and that the grippers 13 are transferred by the other driving method in the other part.

As illustrated in FIG. 4, in the gripper pair 14, the upstream-side gripper 13 and the downstream-side gripper 13 are symmetrical with respect to the bag 100 to be held in the transfer direction. The downstream-side gripper 13 of the pair of grippers 13 is illustrated in FIG. 5, and a detailed configuration of the gripper 13 will be described below with reference to the downstream-side gripper 13. However, a difference between the upstream-side gripper 13 and the downstream-side gripper 13 is a direction relative to the bag 100.

The gripper 13 according to the present embodiment includes a held block 131 which is movably held with respect to the rail member 12 and a grip portion 132 fixed to the held block 131. The rail member 12 has a rectangular shape which is elongated in the vertical direction in a longitudinal cross-sectional view, and the held block 131 includes a U-shaped or substantially U-shaped bracket portion 131A positioned to surround the outer peripheral surface, a upper surface, and a lower surface of the rail member 12, a first roller group 131B arranged on the upper portion of the bracket portion 131A, and a second roller group 131C arranged on the lower portion of the bracket portion 131A.

The bracket portion 131A includes a side wall portion 131A1 extending in the vertical direction, an upper wall portion 131A2 which extends from an upper end of the side wall portion 131A1 and faces the upper surface of the rail member 12, and a lower wall portion 131A3 which extends from a lower end of the side wall portion 131A1 and faces the lower surface of the rail member 12. The first roller group 131B is provided on an inner surface of the upper wall portion 131A2 facing toward the rail member 12, and the second roller group 131C is provided on an inner surface of the lower wall portion 131A3 facing toward the rail member 12.

The first roller group 131B includes a roller which rotates and moves on the upper surface of the rail member 12 and a roller pair which rotates and moves as sandwiching the outer peripheral surface and the inner peripheral surface of the rail member 12 facing each other in the horizontal direction on the upper side, and the second roller group 131C includes a roller which rotates and moves on the lower surface of the rail member 12 and a roller pair which rotates and moves as sandwiching the outer peripheral surface and the inner peripheral surface of the rail member 12 facing each other in the horizontal direction on the lower side. In the first roller group 131B and the second roller group 131C, the roller which rotates and moves on the upper surface of the rail member 12 and the roller which rotates and moves on the lower surface of the rail member 12 sandwich the rail member 12 from above and below, and the roller pair of the first roller group 131B and the roller pair of the second roller group 131C sandwich the rail member 12 from both sides in the horizontal direction. With this structure, swing of the held block 131 in the vertical direction and the horizontal direction at the time of movement is suppressed, and the held block 131 travels in a stable state.

On the inner surface of the side wall portion 131A1 facing toward the rail member 12, the permanent magnet 16 is provided, and on the outer surface facing toward the side opposite to the inner surface, the grip portion 132 is fixed.

The grip portion 132 is projected from the outer surface of the side wall portion 131A1 along the horizontal direction, and the front end of the grip portion 132 sandwiches the side end of the bag 100. Here, as illustrated in FIG. 4, the upstream-side gripper 13 and the downstream-side gripper 13 hold the respective side ends of the bag 100 from both sides different from each other. Therefore, the upstream-side gripper 13 and the downstream-side gripper 13 are symmetrical with respect to the bag 100 to be held, and the difference between the upstream-side gripper 13 and the downstream-side gripper 13 is the direction relative to the bag 100.

Regarding the gripper pair 14 including the pair of grippers 13 described above, the pair of grippers 13 is transferred by the linear motor drive basically in a synchronous state. However, by employing the linear motor drive, a distance between the pair of grippers 13 can be reduced or increased during the transfer or after the gripper 13 is stopped. Specifically, in the present embodiment, when a mouth of the bag 100 is opened as described later, the pair of grippers 13 is moved to be closer to each other so as to approach the side ends of the bag 100, and thereafter, when the mouth of the bag 100 is closed, the pair of grippers 13 is separated from each other so as to be separated from the side ends of the bag 100. If the distance between the pair of grippers 13 can be adjusted, since the bag 100 of which the size has been changed can be properly held even when the size of the bag 100 is changed, this is very useful.

Returning to FIG. 1, a plurality of stations S1 to S9 to execute bag processing is provided on the transfer route R in the present embodiment, and the plurality of stations includes a first station S1 to a ninth station S9. The bag supply device 21 is arranged in the station S1, the bag processing devices 22 to 28 are respectively arranged in the second to eighth stations S2 to S8, and the discharge conveyor device 29 is arranged in the ninth station S9. In the bagging and packaging machine 10, the transfer device 11 sequentially moves the gripper pair 14 to sequentially transfer the bag 100 to the plurality of stations S1 to S9, and each of the bag processing devices 22 to 28 repeatedly executes the bag processing on the bags 100 which are sequentially transferred. Then, by completing all the series of bag processing, a bagged product 100' is produced. Note that each station corresponds to a bag processing region in the present invention. Furthermore, in the present embodiment, the bag 100 seals contents by sealing the mouth of the bag 100.

The bag processing devices 22 to 28 according to the present embodiment include a printing device 22, a print inspection device 23, a bag opening device 24, a liquid filling device 25, a first bag mouth sealing device 26, a second bag mouth sealing device 27, and a bag mouth cooling device 28. Each of the bag supply device 21, the bag processing devices 22 to 28, and the discharge conveyor device 29 are arranged in a region (station) on the transfer route R, that is, close to a predetermined position defined on the transfer route R and aligned along the transfer route R.

The bag supply device 21 arranged in the first station S1 is arranged on one of the pair of straight lanes of the transfer route R, that is, the first straight portion 12A1 and defines an upstream end of the transfer route R. In the first station S1, the bags 100 are extracted one by one from a conveyor magazine which continuously conveys the bags 100, for example, by a sucker included in the bag supply device 21 and delivered to the gripper pair 14. At this time, the gripper pair 14 holds the bag 100 by the pair of grippers 13. The bag supply device 21 according to the present embodiment executes bag supply processing relative to the single gripper pair 14 in a stopped state. However, the bag supply device 21 may execute the bag supply processing as following the transferred gripper pair 14.

The bag 100 which is transferred in the present embodiment is a rectangular bag in a front view, and peripheral edges of a pair of rectangular films facing each other are directly bonded to each other or indirectly bonded to each other via the other member to form the films in a bag-like shape. One side portion of the bag 100 immediately after delivered from the conveyor magazine to the gripper pair 14 is not bonded, and a mouth opened to the outside is formed.

In the illustrated example, the bag 100 is held by the grippers 13 so that the mouth faces upward, and at this time, the pair of grippers 13 separately holds the pair of side ends of the bag 100 extending downward from the mouth side of the bag 100 and facing each other in the horizontal direction. The shape of the bag 100 is not particularly limited, and the shape of the bag 100 may be, for example, a circle, a triangle, or a trapezoid.

The printing device 22 is provided in the second station S2, and the printing device 22 is arranged on one of the pair of straight lanes of the transfer route R, that is, the first straight portion 12A1. In the second station S2, the printing device 22 prints information such as a date of manufacture on the bag 100 held by the gripper pair 14. The printing device 22 according to the present embodiment executes print processing on the bag 100 which is stopped. However, the printing device 22 may execute the print processing as following the transferred bag 100.

The print inspection device 23 is provided in the third station S3, and the print inspection device 23 is arranged on one of the pair of straight lanes of the transfer route R, that is, the first straight portion 12A1. In the third station S3, the print inspection device 23 detects whether or not the information printed by the printing device 22 is properly printed on the bag 100. The print inspection device 23 according to the present embodiment executes print inspection processing on the bag 100 which is stopped. However, the print inspection device 23 may execute the print inspection processing on the bag as following the transferred bag 100. When the print inspection device 23 determines that the printed information is not proper, the gripper pair 14 may drop the bag 100 which has been determined as improper.

The bag opening device 24 is provided in the fourth station S4, and the bag opening device 24 is arranged on one of the pair of straight lanes of the transfer route R, that is, the first straight portion 12A1. In the fourth station S4, the bag opening device 24 opens the mouth of the bag 100. The bag opening device 24 according to the present embodiment opens mouths of the two bags 100 at the same time by two opening sucker pairs 24A. Furthermore, in the present embodiment, the bag opening device 24 opens the mouth of the bag 100, and at the same time, the pair of grippers 13 is moved to be closer to each other by the linear motor drive. As a result, the mouth of the bag 100 is properly opened, and the opening state is maintained.

The bag opening device 24 according to the present embodiment executes opening processing on the bag 100 which is stopped. However, the bag opening device 24 may execute the opening processing as following the transferred bag 100.

The liquid filling device 25 is provided in the fifth station S5, and the liquid filling device 25 is arranged on another one of the pair of straight lanes of the transfer route R, that is, the second straight portion 12A2. Therefore, the bag 100 on which the opening processing has been executed in the fourth station S4 is transferred to the second straight portion 12A2 via the first curved portion 12B1.

In the fifth station S5, the liquid filling device 25 fills the liquid content into the bag 100 via the mouth of the bag 100. The liquid filling device 25 according to the present embodiment includes six liquid filling units 25A and concurrently fills six bags 100 with the contents. The liquid filling device 25 according to the present embodiment executes filling processing on the bag 100 which is stopped. However, the liquid filling device 25 may execute the filling processing as following the transferred bag 100. Furthermore, the content to be filled into the bag 100 is not limited to liquid.

The first bag mouth sealing device 26 is provided in the sixth station S6, and the first bag mouth sealing device 26 is arranged on the another one of the pair of straight lanes of the transfer route R, that is, the second straight portion 12A2. In the present embodiment, before the bag 100 on which the filling processing has been completed reaches the sixth station S6, the pair of grippers 13 is separated from each other by the linear motor drive, and this movement closes the mouth of the bag 100. Thereafter, the first bag mouth sealing device 26 sandwiches the closed mouth by a first heat plate 26A to execute first thermal compression bonding processing (sealing processing).

The first bag mouth sealing device 26 according to the present embodiment closes the mouths of the three bags 100 at the same time. Furthermore, the first bag mouth sealing device 26 according to the present embodiment executes the first thermal compression bonding processing on the bag 100 as following the transferred bag 100. In this example, the first heat plate 26A moves from a processing start position (position of first heat plate 26A in FIG. 1) along the transfer direction as following the bag 100, and after moving to a predetermined position (position of first heat plate 26A in FIG. 2), the first heat plate 26A returns to the processing start position. Note that the first bag mouth sealing device 26 may execute the first thermal compression bonding processing on the bag 100 which is stopped.

The second bag mouth sealing device 27 is provided in the seventh station S7, and the second bag mouth sealing device 27 is arranged on one of the pair of straight lanes of the transfer route R, that is, the first straight portion 12A1. That is, the bag 100 on which the first thermal compression bonding processing has been executed in the sixth station S6 is transferred to the second straight portion 12A2 via the second curved portion 12B2.

In the seventh station S7, the second bag mouth sealing device 27 sandwiches the mouth by a second heat plate 27A to execute second thermal compression bonding processing (sealing processing). The second bag mouth sealing device 27 according to the present embodiment closes the mouths of the two bags 100 at the same time. Furthermore, the second bag mouth sealing device 27 according to the present embodiment executes the second thermal compression bonding processing on the bag 100 which is stopped. However, the second bag mouth sealing device 27 may execute the second thermal compression bonding processing on the bag 100 as following the transferred bag 100.

Subsequently, the bag mouth cooling device 28 is provided in the eighth station S8, and the bag mouth cooling device 28 is arranged on one of the pair of straight lanes of the transfer route R, that is, the first straight portion 12A1. In the eighth station S8, a part of the bag 100 where the thermal compression bonding has been executed is sandwiched and is cooled by a cooling plate 28A, and the mouth is airtightly sealed. The bag mouth cooling device 28 according to the present embodiment cools the mouths of the two bags 100 at the same time. Furthermore, the bag mouth cooling device 28 according to the present embodiment executes cooling processing on the bag 100 which is stopped. However, the bag mouth cooling device 28 may execute the cooling processing on the bag 100 as following the transferred bag 100.

When the bag processing on the eighth station S8 is completed, the bagged product 100' is manufactured. The discharge conveyor device 29 arranged in the ninth station S9 is arranged on one of the pair of straight lanes of the transfer route R, that is, the first straight portion 12A1, and defines a downstream end of the transfer route R. In the ninth station S9, the bagged product 100' is released from the gripper pair 14, and the bagged product 100' is dropped to the discharge conveyor device 29 to be discharged. Furthermore, the gripper pair 14 which has passed through the ninth station S9 returns to the first station S1, and a bag 100 is supplied from the bag supply device 21 to the gripper pair 14 again.

(Transfer Mode of Bag)

Next, a transfer mode of the bag 100 will be described. Among combinations of two devices adjacent to each other of the plurality of bag processing devices 22 to 28, there is a combination which has a relation such that a unit processing time per bag processing of one device (first bag processing device) is different from a unit processing time per bag processing of the other device (second bag processing device) and the number of processed bags 100 per bag processing of one device is different from the number of processed bags 100 per bag processing of the other device.

For example, the unit processing time of the bag opening device 24 is shorter than the unit processing time of the liquid filling device 25, and the number of processed bags 100 per bag processing of the bag opening device 24 is two and is smaller than the number of processed bags 100 per bag processing of the liquid filling device 25 (six).

Furthermore, the unit processing time of the first bag mouth sealing device 26 is shorter than the unit processing time of the liquid filling device 25, and the number of processed bags 100 per bag processing of the first bag mouth sealing device 26 is three and is smaller than the number of processed bags 100 per bag processing of the liquid filling device 25 (six).

In the present embodiment, in order to efficiently produce the bagged product 100' while miniaturizing the entire device and suppressing complication of the device, each bag processing device is controlled and the transfer device 11 controls a transfer state of the gripper pair 14 by using the linear motor drive so that a following relation is established in combinations of the devices:

The number of processed bags 100 on which the bag processing is executed by the device of which the unit processing time is shorter during the unit processing time of the device of which the unit processing time is longer is the same as the number of processed bags 100 per bag processing of the device of which the unit processing time is longer, and the bags 100 on which the bag processing is executed by the upstream-side device equal to or more than the number of the processed bags per bag processing of the downstream-side device are stocked on the upstream side of the downstream-side device while the downstream-side device executes it bag processing.

Specifically, in order to make "the number of processed bags 100 on which the bag processing is executed by the device of which the unit processing time is shorter during the unit processing time of the device which has the longer unit processing time" be the same as the number of processed bags 100 per bag processing of the device of which the unit processing time is longer, the device of which the unit processing time is shorter executes once or a plurality of times (plurality of times in this example) of bag processing during the unit processing time of the device of which the unit processing time is longer. As a result, while the downstream-side device executes the bag processing, the bags 100 "processed by the upstream-side device" equal to or more than the processed bags 100 per bag processing of the downstream-side device are stocked on the upstream side of the downstream-side device.

More specifically, the bag opening device 24, the liquid filling device 25, and the transfer device 11 are controlled so that the number of processed bags 100 on which the bag processing is executed by the bag opening device 24 during the unit processing time of the liquid filling device 25 is the same as the number of processed bags 100 per filling processing of the liquid filling device 25 (six). Furthermore, between the liquid filling device 25 and the first bag mouth sealing device 26, the liquid filling device 25, the first bag mouth sealing device 26, and the transfer device 11 are controlled so that the number of bags 100 on which the sealing processing is executed by the first bag mouth sealing device 26 during the unit processing time of the liquid filling device 25 becomes the same as the number of processed bags 100 per filling processing of the liquid filling device 25 (six).

Figure 2:
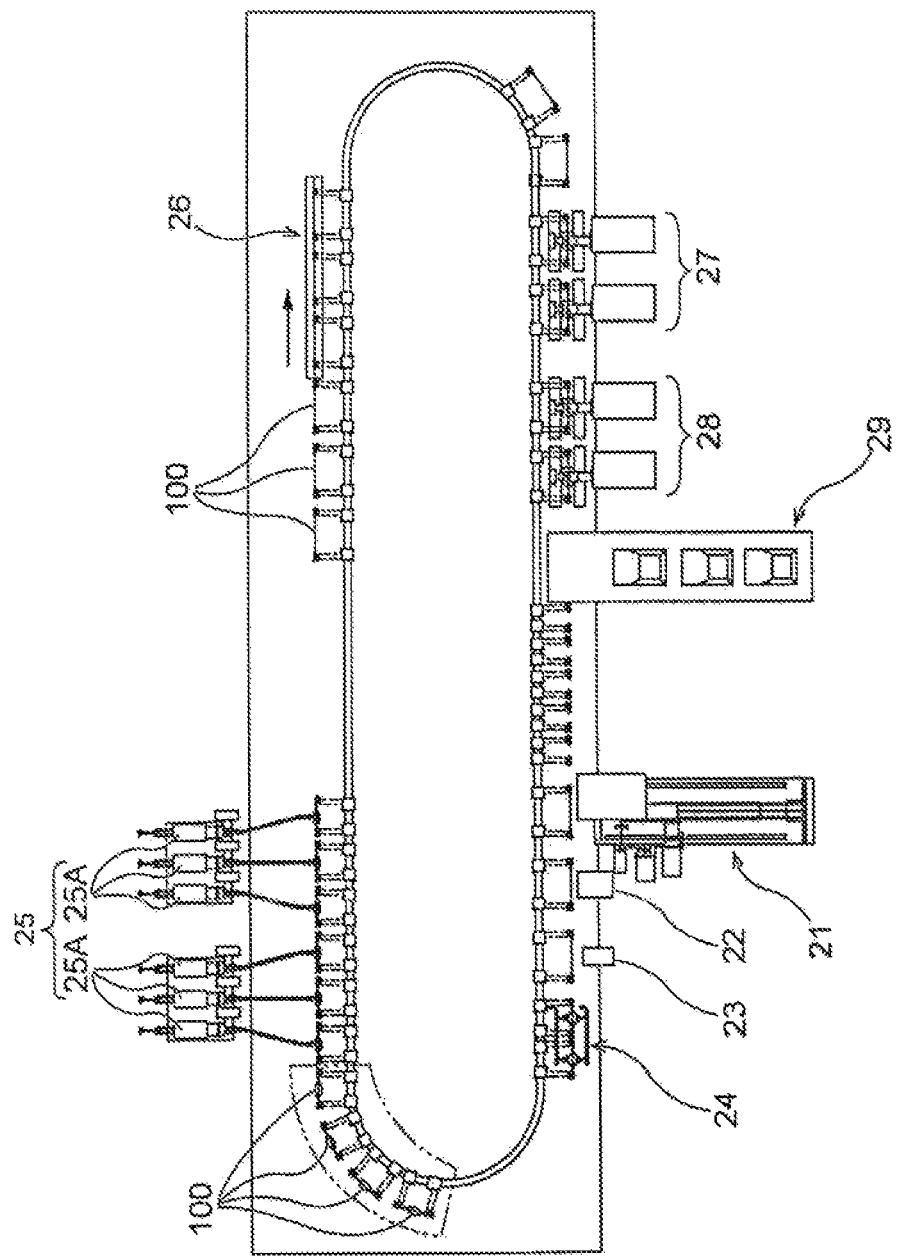
FIG. 2 is a plan view of the bagging and packaging machine illustrated in FIG. 1 and a diagram for explaining bag processing of the bagging and packaging machine.
Figure 3:
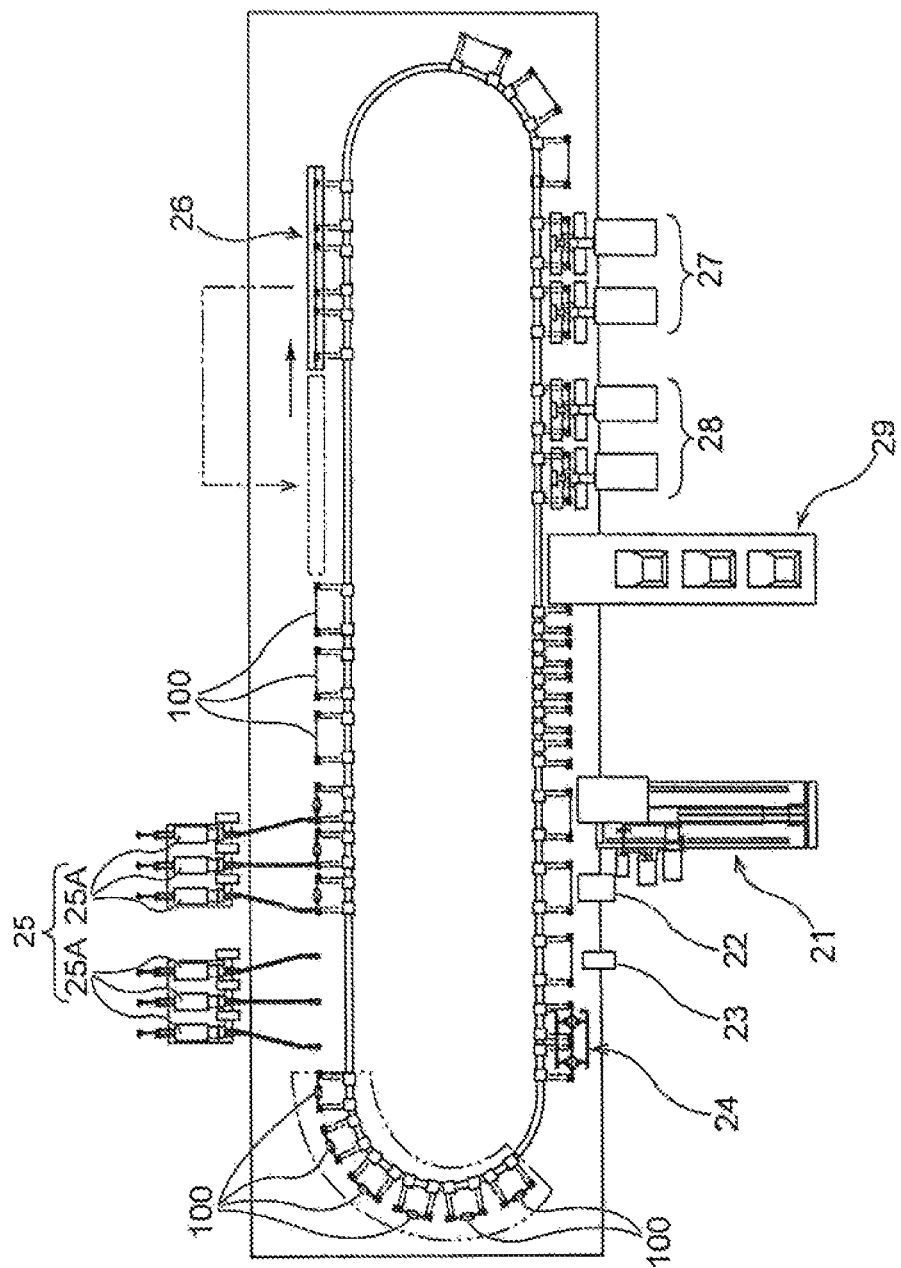
FIG. 3 is a plan view of the bagging and packaging machine illustrated in FIG. 1 and a diagram for explaining the bag processing of the bagging and packaging machine.

In FIG. 1, the liquid filling device 25 is filling the contents into the six bags 100, and in FIG. 3, the liquid filling device 25 has completed the filling processing. In FIG. 2, the liquid filling device 25 is in a state between the state in FIG. 1 and the state in FIG. 3.

In a case where the bag 100 is transferred by the gripper pair 14 in the transfer mode described above, as it is obvious from a region surrounded by an alternate long and two short dashes line in FIGS. 1 to 3, the bag opening device 24 repeats the processing three times to execute the opening processing on the six bags 100 while the liquid filling device 25 fills the contents into the six bags 100.

As a result, until the liquid filling device 25 completes the filling processing, the six bags 100 on which the opening processing has been executed are stocked on the upstream side of the liquid filling device 25. Furthermore, while the first bag mouth sealing device 26 repeats processing twice to execute the sealing processing on six bags 100, the liquid filling device 25 executes the filling processing on the six bags 100 by single processing. As a result, until the first bag mouth sealing device 26 completes the sealing processing once, the three bags 100 on which the filling processing has been executed are stocked on the upstream side of the first bag mouth sealing device 26 or the six bags 100 on which the filling processing has been executed are stocked.

As described above, when the six bags 100 are stocked on the upstream side of the liquid filling device 25 before the liquid filling device 25 completes the filling processing, the liquid filling device 25 can immediately start next filling processing after completing the filling processing. Furthermore, in a case where at least three bags 100 are stocked on the upstream side of the first bag mouth sealing device 26 before the first bag mouth sealing device 26 completes the sealing processing, the first bag mouth sealing device 26 can immediately start next sealing processing after completing the sealing processing. As a result, the bagging and packaging machine 10 according to the present embodiment can efficiently execute the bag processing.

Furthermore, in a conventional continuous transfer type packaging machine, the grippers are constantly transferred at a certain transfer speed. Therefore, for example, a bag following distance of the filling device which takes a lot of time to execute the bag processing relative to the bag is set to be longer than a bag following distance of the bag opening device which does not take a lot of time to execute the bag processing relative to the bag. As a result, the entire size of processor has become larger and more complicated. On the other hand, in the present embodiment, the speed of the bag 100 can be optionally adjusted. For example, in a case where a system is employed in which the first bag mouth sealing device 26 moves as following the bag 100 at the sixth station S6, it is not necessary for the liquid filling device 25 to follow the bag 100, and it is not necessary to match the speeds of the liquid filling device 25, the first bag mouth sealing device 26, and the bag 100 which passes through the liquid filling device 25 and the first bag mouth sealing device 26. Accordingly, an occupation area of the liquid filling device 25 can be smaller than that of the conventional continuous transfer type packaging machine.

Specifically, in the present embodiment, while the first bag mouth sealing device 26 executes the sealing processing as following the bag 100, the liquid filling device 25 executes the filling processing on the bag 100 which is stopped. The liquid filling device 25 completes the filling processing without following the bag 100. Accordingly, it is possible to largely reduce the length of the transfer route than a case where the bag 100 passes through the liquid filling device 25 without stopping and the liquid filling device 25 is moved in accordance with the constant transfer speed of the bag 100.

Therefore, according to the bagging and packaging machine 10 according to the present embodiment, the bagged products can be efficiently produced while the entire size of processor is simplified or miniaturized or the number of bag processing devices are reduced.

Furthermore, in the present embodiment, the bag supply device 21 is arranged on one of the pair of straight lanes of the transfer route R, and the first bag mouth sealing device 26 is arranged on the another one of the pair of straight lanes. This can reduce the size of the entire device than a case where the bag supply device 21 and all the bag processing devices are provided on one of the straight lanes. In particular, in the present embodiment, the second bag mouth sealing device 27 and the bag mouth cooling device 28 are arranged on one of the pair of straight lanes, the liquid filling device 25 is arranged on the another one of the pair of straight lanes. As a result, the liquid filling device 25 and the first bag mouth sealing device 26 are arranged on the straight lane different from the straight lane where the bag supply device 21, the second bag mouth sealing device 27, and the bag mouth cooling device 28 are arranged, and this reduces the size of the entire size of processor.

Furthermore, the liquid filling device 25 is arranged on the straight lane as described above. In this case, since the swing of the bag 100 at the time when the bag 100 is moved is smaller than that in a case where the bag 100 passes through the curved portion, scattering of the contents can be prevented. In addition, since the first bag mouth sealing device 26 is positioned on the downstream side of the liquid filling device 25, the contents are not scattered even in a case where the bag 100 on which the sealing processing has been executed by the first bag mouth sealing device 26 passes through the curved portion. Therefore, according to a layout of the liquid filling device 25 and the first bag mouth sealing device 26, reliability in sanitation can be improved.

The embodiment of the present invention has been described above. However, the present invention is not limited to the embodiment, and various modifications can be applied to the embodiment.

For example, in the above embodiment, by employing a configuration in which while the first bag mouth sealing device 26 executes the sealing processing as following the bag 100, the liquid filling device 25 executes the filling processing on the bag 100 which is stopped, the length of the transfer route is reduced that that of the conventional continuous transfer type packaging machine. Accordingly, the reduction in the size of the entire device can be realized. However, the liquid filling device 25 can execute the filling processing as following the bag 100. Even in this case, it is not necessary to adjust the following speed of the liquid filling device 25 to the following speed of the other bag processing devices or the transfer speed of the bag 100. Therefore, for example, when the liquid filling device 25 executes the filling processing as following the bag 100 in a bag processing region (S5) which is set to be smaller than a distance determined by multiplying the transfer speed at the time when the bag 100 passes through the first bag mouth sealing device 26 by the unit processing time of the device (liquid filling device 25), the length of the transfer route can be suppressed to be shorter than that of the conventional continuous transfer type packaging machine. At this time, a following distance of the liquid filling device 25 (range of bag processing region (S5)) is preferably, for example, ⅘, and more preferably, equal to or less than ½ of the distance determined by multiplying the transfer speed at the time when the bag 100 passes through the first bag mouth sealing device 26 by the unit processing time of the device (liquid filling device 25).

Furthermore, in the embodiment, the gripper pair 14 clamps and transfers the bag 100 in which the contents are sealed by sealing the mouth thereof. Alternatively, it is possible that a spout holding claw for gripping a spout may be employed as a holding member and this is transferred by the linear motor drive on the rail member 12. In this case, for example, the spouts are delivered from a spout supply device to a spout holding claw, and next, bag processing for connecting the bag to the spout is executed. Thereafter, bag processing for filling and sealing the bag with the spouts is executed. In other words, the bag processing devices in this case include a device for executing bag processing on the spouts and a device for executing bag processing on the bag with the spouts.

The invention claimed is:

1. A bag processor comprising:
a transfer device including a rail member which defines an endless transfer route on a horizontal surface and a plurality of holding members which are held by the rail member and each of which is capable of moving along the transfer route, and configured to be transferred along the transfer route as the holding member holds an object to be held by the holding member, wherein each object is selected from the group consisting of a bag, a spout, or a bag with a spout;
a supply device configured to deliver the object to the holding member; and
at least two processing devices arranged on the transfer route, positioned on a downstream side of the supply device in a transfer direction of the object, and configured to repeatedly execute a process on the object, wherein the process is selected from the group consisting of processing a bag, processing a spout, or processing a bag with a spout, in accordance with the object, wherein
a plurality of electromagnets aligned along the transfer route is provided on the rail member, a permanent magnet is provided on the holding member, each holding member is transferred by linear motor drive, and a transfer speed is adjusted according to a current supplied to the electromagnet,
the processing devices include a first processing device and a second processing device arranged on the downstream side of the first processing device in the transfer direction,
a first unit processing time per process of the first processing device is different from a second unit processing time per process of the second processing device, such that one of the first unit processing time and the second unit processing time is a shorter unit processing time and the other is a longer unit processing time, and a first number of processed objects per processing of the first processing device is different from a second number of processed objects per processing of the second processing device, wherein the first number and second number are controlled, and a transfer state of the holding member is controlled by the transfer device, such that a processing device having the longer unit processing time has a larger number of processed objects per processing and such that a number of objects processed by the first processing device over the longer unit processing time is equal to a number of objects processed by the second processing device over the longer unit processing time, and
any objects on which the processing has been executed by the first processing device that exceed the second number are stocked on the upstream side of the second processing device while the second processing device executes processing.

2. The bag processor according to claim 1, wherein
the first processing device and the second processing device execute processing in processing regions which are determined in correspondence with the respective devices,
the processing device having the shorter unit processing time executes processing as following each object at a following speed synchronized with a transfer speed of the object which is transferred by the holding member in the processing region set for the device in the shorter unit processing time, and
the processing device having the longer unit processing time executes the processing as following the object or executes the processing on the object which is stopped in the processing region set to be smaller than a distance determined by multiplying a transfer speed at the time when the object passes through the processing device having the shorter unit processing time by the shorter unit processing time.

3. The bag processor according to claim 2, wherein
the holding member is a gripper pair including a pair of grippers next to each other which is separately held by the rail member and is separately movable along the transfer route, and the pair of grippers holds the object.

4. The bag processor according to claim 2, wherein
the holding member is a spout holding claw for holding a spout.

5. The bag processor according to claim 1, wherein both the first processing device and the second processing device execute processing on the object during respective times when the object is stopped.

6. The bag processor according to claim 5, wherein the holding member is a gripper pair including a pair of grippers next to each other which is separately held by the rail member and is separately movable along the transfer route, and the pair of grippers holds the object.

7. The bag processor according to claim 5, wherein the holding member is a spout holding claw for holding a spout.

8. The bag processor according to claim 1, wherein the holding member is a gripper pair including a pair of grippers next to each other which is separately held by the rail member and is separately movable along the transfer route, and the pair of grippers holds the object.

9. The bag processor according to claim 1, wherein the object comprises a bag which seals contents by sealing a mouth of the bag,
the first processing device is a filling device which fills the contents into the bag, and
the second processing device is a first bag mouth sealing device which seals the mouth of the bag.

10. The bag processor according to claim 9, wherein the transfer route has a racetrack shape in which a pair of straight lanes and a pair of semicircular curved lanes for connecting between one set of respective ends of the pair of straight lanes and between another other set of respective ends form a loop shape, and
the supply device is arranged on a first one of the pair of straight lanes, and the first bag mouth sealing device is arranged on another a second one of the pair of straight lanes.

11. The bag processor according to claim 10, wherein the filling device is a liquid filling device and is arranged on the first one of the pair of straight lanes.

12. The bag processor according to claim 10, wherein the filling device is a liquid filling device and is arranged on the second one of the pair of straight lanes.

13. The bag processor according to claim 12, wherein further comprising a bag mouth cooling device which is arranged on a downstream side of the first bag mouth sealing device, and
the bag mouth cooling device is arranged on one of the pair of straight lanes.

14. The bag processor according to claim 13, further comprising a second bag mouth sealing device which is arranged on the downstream side of the first bag mouth sealing device and configured and arranged to seal the mouth of the bag, and
the second bag mouth sealing device is arranged on one of the pair of straight lanes.

15. The bag processor according to claim 1, wherein the holding member is a spout holding claw for holding a spout.

16. The bag processor according to claim 1, wherein the object to be held by the holding member is selected from the group consisting of a bag and a spout.

* * * * *